Patented Jan. 31, 1933

1,895,713

UNITED STATES PATENT OFFICE

WINFRID HENTRICH, OF LEVERKUSEN-ON-THE-RHINE, JOSEF HILGER, OF COLOGNE-MULHEIM-ON-THE-RHINE, AND RUDOLF KNOCHE, OF LEVERKUSEN-ON-THE-RHINE, GERMANY, ASSIGNORS TO GENERAL ANILINE WORKS, INC., OF NEW YORK, N. Y., A CORPORATION OF DELAWARE

β-NAPHTHYL-AMINOARYL-HYDROXY FATTY ACIDS

No Drawing. Application filed February 12, 1930, Serial No. 427,937, and in Germany February 18, 1929.

The present invention relates to a process of preparing β-naphthyl-aminoaryl-hydroxy fatty acids and to the new products obtainable thereby, more particularly it relates to compounds of the probable general formula:

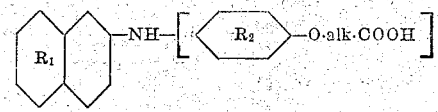

wherein the benzene nuclei $R_1$ and $R_2$ may be substituted, NH being attached to $R_2$ in para or meta-position to the hydroxy fatty acid residue, "alk" meaning an alkylene group, such as $CH_2$, $C_2H_4$, $C_3H_6$,

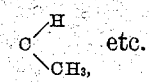 etc.

Our new products are obtainable by heating in aqueous solution or suspension a compound of the general formula:

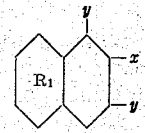

wherein $x$ stands for an amino or a hydroxy group and the $y$'s stand for hydrogen, one of which may be substituted by a carboxylic acid group, and wherein the benzene nucleus $R_1$ may be substituted by substituents of the group consisting of halogen, alkyl, the alkoxy, hydroxy, amino, sulfonic acid and carboxylic acid groups, and at least equimolecular quantity of a water-soluble sulfite, such as sodium bisulfite, and an about equimolecular quantity of a compound of the general formula:

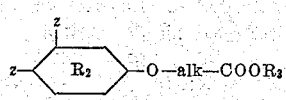

wherein one $z$ stands for an amino group and the other $z$ stands for hydrogen, $R_2$ may be substituted by any substituents, "alk" meaning an alkylene group and $R_3$ hydrogen, alkyl, or an alkali metal.

The process is carried out between about 80° C. and the boiling point of the reaction mixture and is complete when the starting organic compounds can no more be detected, say after several hours. Instead of working with a mixture of a β-naphthol or a β-naphthyl-amine, a watersoluble sulfite and an amino phenoxy fatty acid or a salt thereof, there may be caused the compound of a sulfite with a β-naphthol or β-naphthyl-amine and an amino-phenoxy fatty acid to react upon each other, both processes being equivalent for the purpose of the invention.

Our new compounds are generally colorless crystalline substances, soluble in aqueous alkalies from which solutions they are reprecipitated by the addition of an acid and are valuable intermediate products in the manufacture of dyestuffs.

The invention is illustrated by the following examples, without being restricted thereto:

*Example 1.*—17.2 parts by weight of 2-naphthol-3-carboxylic acid are dissolved in 300 parts of water with the addition of the quantity of sodium carbonate necessary for neutralization, then mixed with a solution of 19.7 parts by weight of sodium 4-aminophenoxy acetate in 200 parts of water and heated on the boiling water bath with stirring with 800 parts by weight of sodium bisulfite solution (40%). After a short time a vigorous evolution of carbon dioxide begins in consequence of the splitting off of the carboxylic acid group from the nucleus. Heating is continued for 8 hours, when the sulfurous acid is boiled off in the customary manner with excess hydrochloric acid. On cooling, the 2'-naphthyl-4-aminophenoxy acetic acid of the formula:

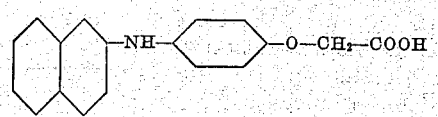

separates, contaminated with a little β-naphthol. On recrystallizing, for example from ether, the 2'-naphthyl-4-amino-phenoxy acetic acid is obtained in the form of a white crystalline powder, which dissolves readily in alkalies, melts at 156° C. and couples with diazotized 4-nitraniline-2-sulfonic acid in the presence of acetic acid to form a bluish-violet dyestuff.

On using 2-naphthol-6-carboxylic acid instead of the 2-naphthol-3-carboxylic acid an exactly analogous process yields 6'-carboxy-2'-naphthyl-4-aminophenoxy acetic acid, and when instead of the naphthol carboxylic acids the naphthylamino carboxylic acids are employed the same end products are obtained.

The 6'-carboxy-2'-naphthyl-4-aminophenoxy acetic acid is a greyish-green crystalline powder soluble in dilute alkalies from which solution it is precipitated by the addition of acids. In a mineral acid emulsion it can be combined with diazotized 4-nitraniline-2-sulfonic acid giving a difficultly soluble blue-violet dye. With nitrous acid it gives a slightly colored nitroso compound.

*Example 2.*—24.6 parts by weight of sodium-2-naphthol-7-sulfonate are dissolved in 500 parts of water with 19.7 parts by weight of sodium 4-aminophenoxy acetate and boiled for 20 hours with stirring under a reflux condenser with 700 parts by weight of a sodium bisulfite solution (40%). Thereafter hydrochloric acid is employed for rendering strongly acid to Congo red in the customary manner and the sulfurous acid is boiled off. On cooling the 7'-sulfo-2'-naphthyl-4-aminophenoxy acetic acid of the formula:

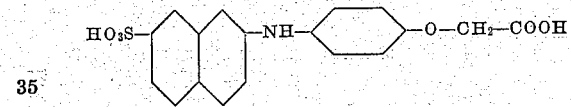

separates out as a fine crystalline powder. The yield is almost theoretical and the final product is of great purity.

The process proceeds in an exactly analogous manner on starting from 2-naphthol- or 2-naphthylamine-5.7-disulfonic acid or from 2-naphthol-5-, 6-, or 8-mono-sulfonic acid or from 2-naphthylamine-5-, 6-, 7- or 8-monosulfonic acid instead of from 2-naphthol-7-sulfonic acid. Alternatively the sulfurous acid compound of the β-naphthol sulfonic acid can be first produced in the customary manner and this then caused to react with the amino-phenoxy acetic acids.

The 7'-sulfo-2'-naphthyl-4-aminophenoxy-acetic acid and its sodium salt are easily soluble in water and are precipitated from the aqueous solution by the addition of common salt. Combined with 4-nitraniline-2-sulfonic acid in an acid solution a violet dye results. With nitrous acid a yellowish nitroso compound is obtained. The 5'-, 6'-, or 8'-sulfo-2'-naphthyl-4- or 3-amino-phenoxy acetic acids have quite similar properties to the above mentioned 7'sulfo-2'-naphthyl-4-aminophenoxy acetic acid.

*Example 3.*—26.1 parts by weight of sodium 2.8-amino-naphthol-6-sulfonate are dissolved in 500 parts of water with 19.7 parts by weight of sodium 4-aminophenoxy acetate and after the addition of 800 parts by weight of sodium bisulfite solution (40%) heated to boiling for about 20 hours with stirring under a reflux condenser. The sulfurous acid is then removed by boiling with excess hydrochloric acid and sodium chloride added to the liquor. On cooling the 8'-hydroxy-6'-sulfo-2'-naphthyl-4-aminophenoxy acetic acid of the formula:

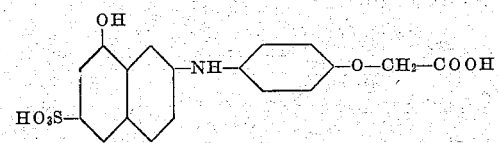

separates out as a sandy powder.

On using 2.8-dihydroxynaphthalene-6-sulfonic acid instead of the 2.8-aminonaphthol-6-sulfonic acid the same ultimate product is obtained.

When starting from 1.6-aminonaphthol-3-sulfonic acid the same method of working yields 5'-amino-7'-sulfo-2'-naphthylaminophenoxy acetic acid:

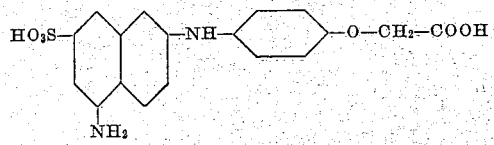

The 5'-amino-7'-sulfo-2'-naphthyl-4-aminophenoxy acetic acid is a greyish crystalline powder soluble in dilute alkalies. By treatment with nitrous acid an easily soluble yellow nitroso-diazo compound is obtained. Combined with diazotized 4-nitraniline-2-sulfonic acid in a weakly mineral acid solution a bluish-violet dye is obtained.

*Example 4.*—26.2 parts by weight of sodium, 2.5-dihydroxynaphthalene-7-sulfonate are dissolved in 100 parts of water with 19.7 parts by weight of sodium aminophenoxy acetate and boiled for 16 hours with stirring with 800 parts by weight of sodium bisulfite solution (40%). After cooling completely the solution is filtered from the separated precipitate. After boiling with hydrochloric acid only very little can be separated from the filtrate. By far the greater part of the reaction product is found in the residue left on filtration, which is made into a paste with a little water and heated with a little hydrochloric acid to remove any sulfurous acid still present. After cooling and filtering the 7'-sulfo-5'-hydroxy-2'-naphthyl-4-aminophenoxy acetic acid of the formula:

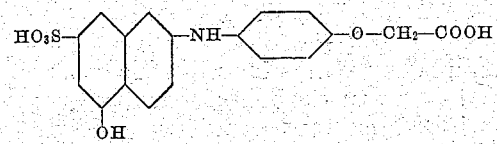

is obtained as a white powder, of great purity and in about 80% of the calculated yield. The new compound, in a solution weakly acid to Congo red, couples with diazotized 4-nitraniline-2-sulfonic acid to a bluish-violet dyestuff. With nitrous acid it forms a nitroso compound, which on pouring into sodium carbonate solution gives a pale yellow coloration.

On using the 4-aminophenoxy acetic acid ethylester instead of the 4-aminophenoxy acetic acid and saponifying the ester the same end product is obtained. By replacing the 4-aminophenoxy acetic acid by the 4-amino-2-methylphenoxy acetic acid the same process yields 7'-sulfo-5'-hydroxy-2'-naphthyl-4-amino-2-methylphenoxy acetic acid. On starting from 4-amino-2-chlorophenoxy acetic acid (prepared by the interaction of the sodium salt of the corresponding nitrophenol with monochloroacetic acid and subsequent reduction with iron and acetic acid) there is obtained 7'-sulfo-5'-hydroxy-2'-naphthyl-4-amino-2-chloro-phenoxy acetic acid. All these compounds possess essentially the same properties and show a similar chemical behaviour to the products described above. Finally on using 4-amino-phenoxy-β-propionic acid there is obtained 7'-sulfo-5'-hydroxy-2'-naphthyl-4-amino- (β - phenoxy - propionic acid). When employing isomeric aminophenoxy acetic acids the isomeric hydroxy sulfonaphthylamino phenoxy acetic acids are obtained just as smoothly as in the above examples.

The compounds obtained from the 3-amino-phenoxy acetic acid possess similar properties to those obtained from the 4-amino-phenoxy acetic acid.

*Example 5.*—23.8 parts by weight of sodium 2.6-diaminonaphthalene-8-sulfonate are dissolved in 100 parts of water with 19.7 parts by weight of sodium 4-aminophenoxy acetate and boiled for 20 hours with stirring under a reflux condenser with 800 parts by weight of sodium bisulfite solution (40%). The solution is then rendered strongly acid to Congo red with concentrated hydrochloric acid and the sulfurous acid boiled off. On cooling the 6'-amino-8'-sulfo-2'-naphthyl-4-aminophenoxy acetic acid of the formula:

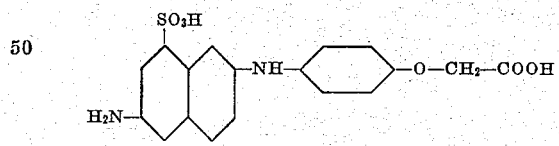

separates as a fine crystalline precipitate.

We claim:

1. The process which comprises causing a compound of the general formula:

wherein $x$ stands for an amino or a hydroxy group, the $y$'s stand for hydrogen, one of which may be substituted by a carboxylic acid group, an at least equimolecular quantity of a watersoluble sulfite and an about equimolecular quantity of a compound of the general formula:

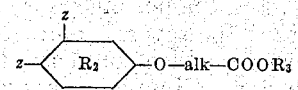

wherein one $z$ stands for an amino group and the other $z$ stands for hydrogen, "alk" meaning an alkylene group, $R_3$ stands for hydrogen, alkyl or an alkali metal, the nuclei $R_1$ and $R_2$ of the components may be substituted by substituents of the group consisting of halogen, alkyl, the alkoxy, hydroxy, amino, sulfonic acid and carboxylic acid groups, to react upon each other in aqueous solution or suspension at a temperature between about 80° C. and the boiling point of the reaction mixture for several hours.

2. The process which comprises causing a compound of the general formula:

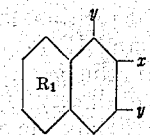

wherein $x$ stands for an amino or a hydroxy group, the $y$'s stand for hydrogen, one of which may be substituted by a carboxylic acid group, an at least equimolecular quantity of sodium bisulfite and an about equimolecular quantity of a compound of the general formula:

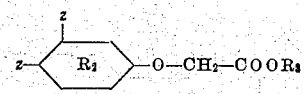

wherein one $z$ stands for an amino group and the other $z$ stands for hydrogen, $R_3$ stands for hydrogen, alkyl or an alkali metal, the nuclei $R_1$ and $R_2$ of the components may be substituted by substituents of the group consisting of halogen, alkyl, the alkoxy, hydroxy, amino, sulfonic acid and carboxylic acid groups, to react upon each other in aqueous solution or suspension at a temperature between about 80° C. and the boiling point of the reaction mixture for several hours.

3. The process which comprises causing a compound of the general formula:

an at least equimolecular quantity of sodium bisulfite and an about equimolecular quantity of a compound of the general formula:

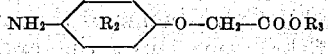

wherein $R_3$ stands for hydrogen or an alkali metal, the nuclei $R_1$ and $R_2$ of the components may be substituted by substituents of the group consisting of halogen, alkyl, the alkoxy, hydroxy, amino, sulfonic acid and carboxylic acid groups, to react upon each other in aqueous solution at a temperature between about 80° C. and the boiling point of the reaction mixture for several hours.

4. The process which comprises boiling in aqueous solution sodium-2.5-dihydroxynaphthalene-7-sulfonate, an at least equimolecular quantity of sodium bisulfite and an about equimolecular quantity of sodium para-aminophenoxy acetate for several hours.

5. As new products β-naphthylaminoarylhydroxy fatty acids of the probable general formula:

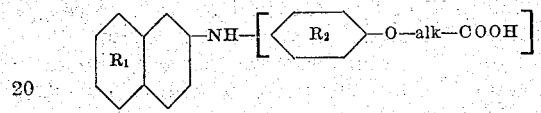

wherein "alk" stands for an alkylene group, the group NH being attached to the benzene nucleus $R_2$ in para- or meta-position to the hydroxy fatty acid residue, and wherein the benzene nuclei $R_1$ and $R_2$ may be substituted by substituents of the group consisting of halogen, alkly, the alkoxy, hydroxy, amino, sulfonic acid and carboxylic acid groups, being generally colorless, crystalline substances, soluble in aqueous alkalies from which solutions they are reprecipitated by the addition of an acid and being valuable intermediate products in the manufacture of dyestuffs.

6. As new products β-naphthylaminoarylhydroxy fatty acids of the probable general formula:

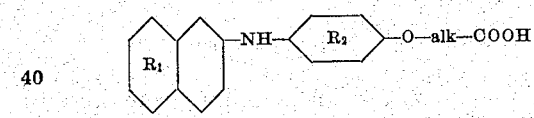

wherein "alk" stands for an alkylene group, and the benzene nuclei $R_1$ and $R_2$ may be substituted by substituents of the group consisting of halogen, alkyl, the alkoxy, hydroxy, amino, sulfonic acid and carboxylic acid groups, being generally colorless crystalline substances, soluble in aqueous alkalies from which solutions they are reprecipitated by the addition of an acid and being valuable intermediate products in the manufacture of dyestuffs.

7. As new products β-naphthylaminoarylhydroxy fatty acids of the probable general formula:

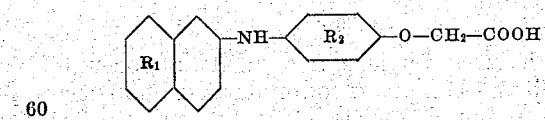

wherein the benzene nuclei $R_1$ and $R_2$ may be substituted by substituents of the group consisting of halogen, alkyl, the alkoxy, hydroxy, amino, sulfonic acid and carboxylic acid groups, being generally colorless crystalline substances, soluble in aqueous alkalies from which solutions they are reprecipitated by the addition of an acid and being valuable intermediate products in the manufacture of dyestuffs.

8. As a new product the β-naphthylaminoaryl-hydroxy fatty acid of the probable formula:

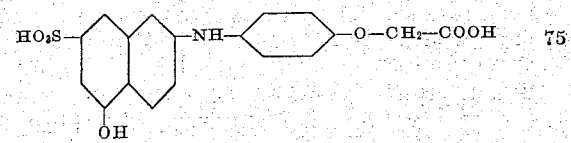

being a white powder, soluble in water and being a valuable intermediate product in the manufacture of dyestuffs.

In testimony whereof, we affix our signatures.

WINFRID HENTRICH.
JOSEF HILGER.
RUDOLF KNOCHE.